US006937461B1

(12) United States Patent
Donahue, IV

(10) Patent No.: US 6,937,461 B1
(45) Date of Patent: Aug. 30, 2005

(54) MODULAR POWER DISTRIBUTION UNIT, MODULE FOR THE POWER DISTRIBUTION UNIT, AND METHOD OF USING THE SAME

(76) Inventor: William F. Donahue, IV, 11 Connors Farm Dr., Smithfield, RI (US) 02917

( * ) Notice: Subject to any disclaimer, the term of this patent is extended or adjusted under 35 U.S.C. 154(b) by 352 days.

(21) Appl. No.: 10/306,532

(22) Filed: Nov. 27, 2002

Related U.S. Application Data

(60) Provisional application No. 60/333,794, filed on Nov. 28, 2001.

(51) Int. Cl.[7] .................................................. H02B 1/26

(52) U.S. Cl. .......................... 361/622; 174/50; 174/59; 307/70; 361/823; 361/829; 361/727; 361/673; 361/644; 361/601; 439/532

(58) Field of Search .............................. 174/50, 59, 48; 307/11, 147, 112–113, 70, 64; 361/110, 111, 361/601, 644, 624, 641, 648, 657, 678, 724–727, 361/823; 439/55, 65, 92, 82, 94, 110, 638, 439/716, 532

(56) References Cited

U.S. PATENT DOCUMENTS

D247,894 S 5/1978 O'Donnell
D269,426 S 6/1983 Pyle
4,740,167 A 4/1988 Millhimes et al.
5,015,203 A 5/1991 Furrow
5,073,120 A 12/1991 Lincoln et al.
D341,124 S 11/1993 Krokaugger
D341,814 S 11/1993 Krogaugger
5,277,609 A 1/1994 Ondrejka
D344,067 S 2/1994 Krokaugger
5,318,454 A 6/1994 Deer et al.
5,383,090 A 1/1995 Freundner et al.
5,656,915 A 8/1997 Eaves
D385,253 S 10/1997 Spriester et al.
5,675,194 A 10/1997 Domigan
5,784,249 A * 7/1998 Pouliot ........................ 361/622
5,821,636 A * 10/1998 Baker et al. .................. 370/70
5,894,392 A 4/1999 McDonald
5,982,652 A 11/1999 Simonelli et al.
6,058,019 A 5/2000 Graves et al.

(Continued)

OTHER PUBLICATIONS

"APC American Power Conversion, selected pages," (1997).

*Primary Examiner*—Gregory Thompson
(74) *Attorney, Agent, or Firm*—Salter & Michaelson

(57) ABSTRACT

A modular power distribution unit (PDU) for supplying electric power to attached equipment in environments such as data centers, computer rooms, and communication centers, where power requirements for attached equipment may vary. The power distribution unit includes a frame and one or more user-replaceable power modules, which fit into slots in the frame. Each power module provides one of more plug receptacles for attaching equipment to provide power thereto. The power modules are available in a variety of receptacle types, receptacle numbers, and power rating configurations to accommodate various equipment in a particular environment, as needed. The frame includes an internal connector panel for distributing power from a power source to the power modules when they are inserted in the frame. The power modules may be removed, installed, and interchanged in the frame without interrupting power to other power modules or to the power distribution unit.

46 Claims, 9 Drawing Sheets

U.S. PATENT DOCUMENTS 6,078,503 A 6/2000 Gallagher et al.
6,115,822 A 9/2000 Kim et al.
6,172,875 B1 1/2001 Suzuki et al.
6,175,490 B1 1/2001 Papa et al.
6,208,522 B1 3/2001 Manweiler et al.
6,222,708 B1 4/2001 Severson et al.
6,229,691 B1 * 5/2001 Tanzer et al. .............. 361/622
6,294,848 B1 9/2001 Goodrich, II

* cited by examiner

MODULAR POWER DISTRIBUTION UNIT, MODULE FOR THE POWER DISTRIBUTION UNIT, AND METHOD OF USING THE SAME

RELATED CASES

Priority is hereby claimed under 35 U.S.C. § 119(e) to commonly owned and U.S. Provisional Patent Application No. 60/333,794 which was filed on Nov. 28, 2001.

TECHNICAL FIELD

The present application is directed to a modular power distribution unit and method of use and, in particular, to a hot-swappable modular distribution unit and method of use.

RELATED ART

Many types of power distribution units (PDUs) are available for distributing power to components in environments such as, for example, data centers, computer rooms, and communication centers. Presently available PDU systems typically include a box with fixed devices. Commercially available PDUs typically have fixed plug receptacles and breakers, the selection of which is very limited. Frequently, the available PDUs may not include a sufficient variety of receptacles for the different equipment that are used in such environments. When that is the case, users must order additional PDUs to accommodate the user's particular needs. Therefore, when faced with a variety of receptacle needs, a user must frequently select many different PDUs in order to meet the plug receptacle needs for each component requiring power. Thus, the limited configurations of plug receptacles in presently available PDUs increases the expense to the user and increases the amount of space used. This can create many redundant or unuseable plug receptacles that will go unused, and that the user otherwise would not order.

In addition, presently available PDUs must be hard-wired into the existing system, which, of course, requires the expertise of an electrician. There are many disadvantages to requiring an electrician to hard-wire each additional individual PDU. The PDU cannot be installed immediately, because the services of an electrician must be scheduled. Power to the existing PDUs must be shut off in order to allow the electrician to perform the connection to the new additional PDU(s). When power to the PDU system is shut down, equipment to which power is supplied by the PDUs must be shut off as well, if an alternate source of power is not available. In addition, when equipment is shut off, or is not powered redundantly, workers and systems are no longer productive.

SUMMARY

A solution to the problems of prior power distribution units is provided in the present disclosure, which provides electrical power to equipment in environments such as data centers, computer rooms, or communications centers. The present disclosure recognizes that in these and other environments, the power requirements for the various equipment are multiple and varied, and subject to change. In a computer room, for example, the addition of a computer server, several PC's, or associated peripherals such as printers will require that the electric power be upgraded to accommodate the new equipment. Various electrical receptacles of certain configurations and power ratings must be supplied or the new equipment cannot operate. Also, in an environment such as a computer room, it is desirable for the new power requirements to be fulfilled and changes and upgrades be made without interrupting the power to the existing equipment, which may be involved in critical operations.

The power distribution unit of the present disclosure allows the electric power to be effectively changed or upgraded to accommodate the new power requirements without interrupting power to existing attached systems or without incurring significant increased cost or inconvenience for users.

The power distribution unit includes a frame and one or more user-replaceable power modules, which fit into slots in the frame. Each power module provides one or more plug receptacles for attaching equipment to provide power thereto. The power modules are available in a variety of receptacle types, receptacle numbers, and power rating configurations to accommodate various equipment in a particular environment, as needed.

The frame includes an internal connector panel for distributing power from a power source to the power modules when they are inserted in the frame. The internal connector panel is also a dividing wall, which separates the frame into a region for accommodating power modules and a region for receiving power from a power source and routing the power to the connectors on the connector panel.

In another aspect of the present disclosure, the power modules have the capability to be "hot-swapped," where existing modules may be removed and replaced without shutting down any other modules or without the shutting down the electric power to the power distribution unit itself.

In an alternative embodiment, the power distribution unit includes a remote control capability to provide control of individual control of the power modules from telephone, cable, or DSL lines. In this embodiment, the power distribution unit includes a remote control unit and circuitry, which allows the power distribution unit to receive and respond to control signals from a distance to implement functions such as sequencing the start-up or shut-down of individual power modules, timed start-up and shut-down, or direct user control as desired. Alternatively, the individual power modules may be controlled by a stored computer program.

In still another alternative embodiment, the concepts of the present invention may be incorporated into entertainment products such as VCRs and DVDs to facilitate adapting these devices for countries having different electrical source voltages, frequencies, and plug types. In this embodiment, the entertainment product accepts into a slot a power module adapted for receiving and converting power from a country's domestic electric power system for use in powering the product. The power module includes a receptacle for the country of use.

These and other features of the present disclosure will be understood from the description to follow, taken in conjunction with the accompanying drawings.

BRIEF DESCRIPTION OF THE DRAWINGS

Features and advantages of the present disclosure will become apparent to those skilled in the art from the description below, with reference to the following drawing figures, in which.

DETAILED DESCRIPTION OF THE PREFERRED EMBODIMENTS

The power distribution unit 10 of the present disclosure allows users to select configurations of plugs and receptacles to be compatible with the user's specific needs. The system has a frame and module construction that is scalable and customizable, as will be described.

Figure 1:
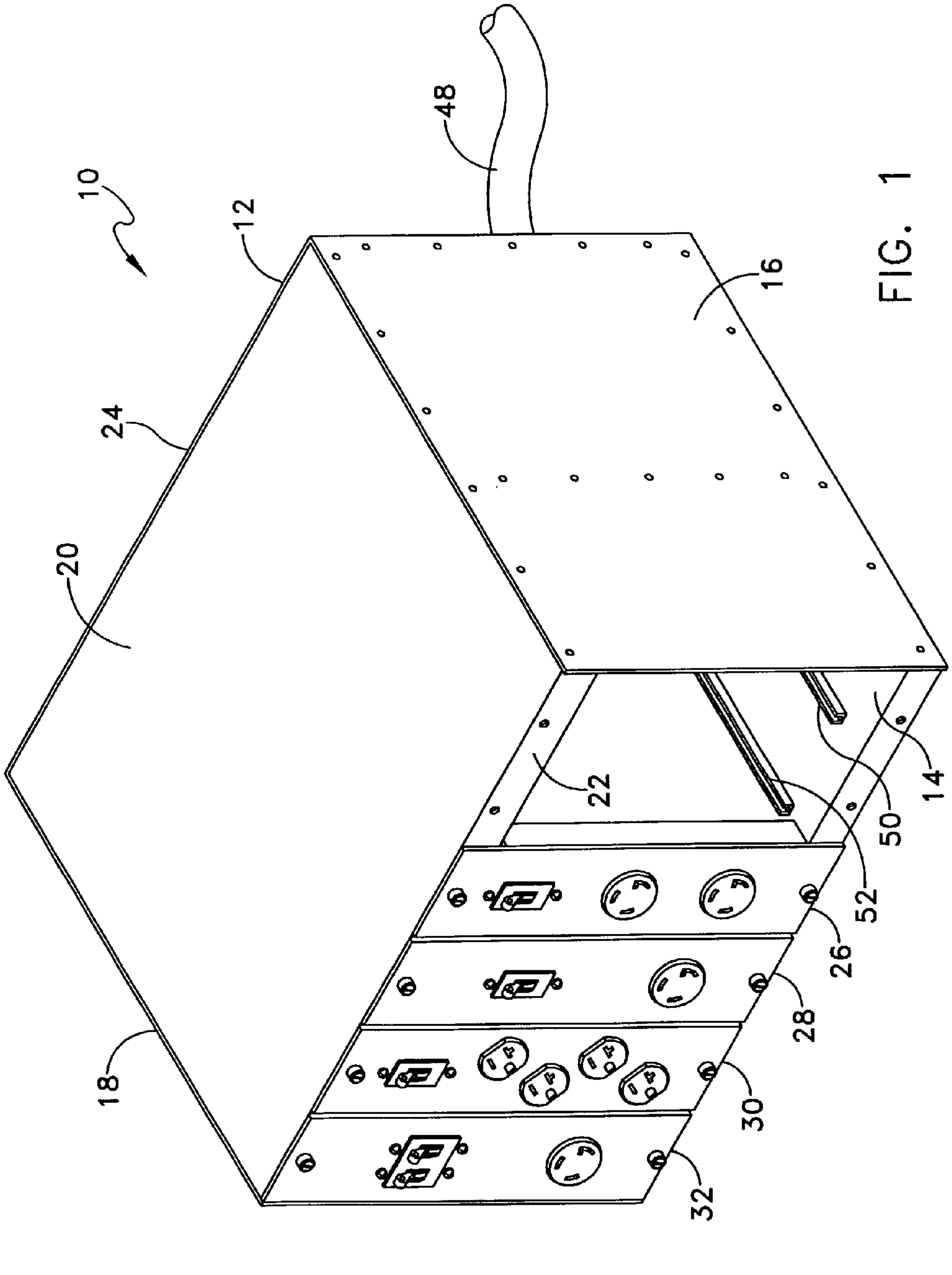
FIG. 1 is a perspective view of a power distribution unit according to the present disclosure.
Figure 2:
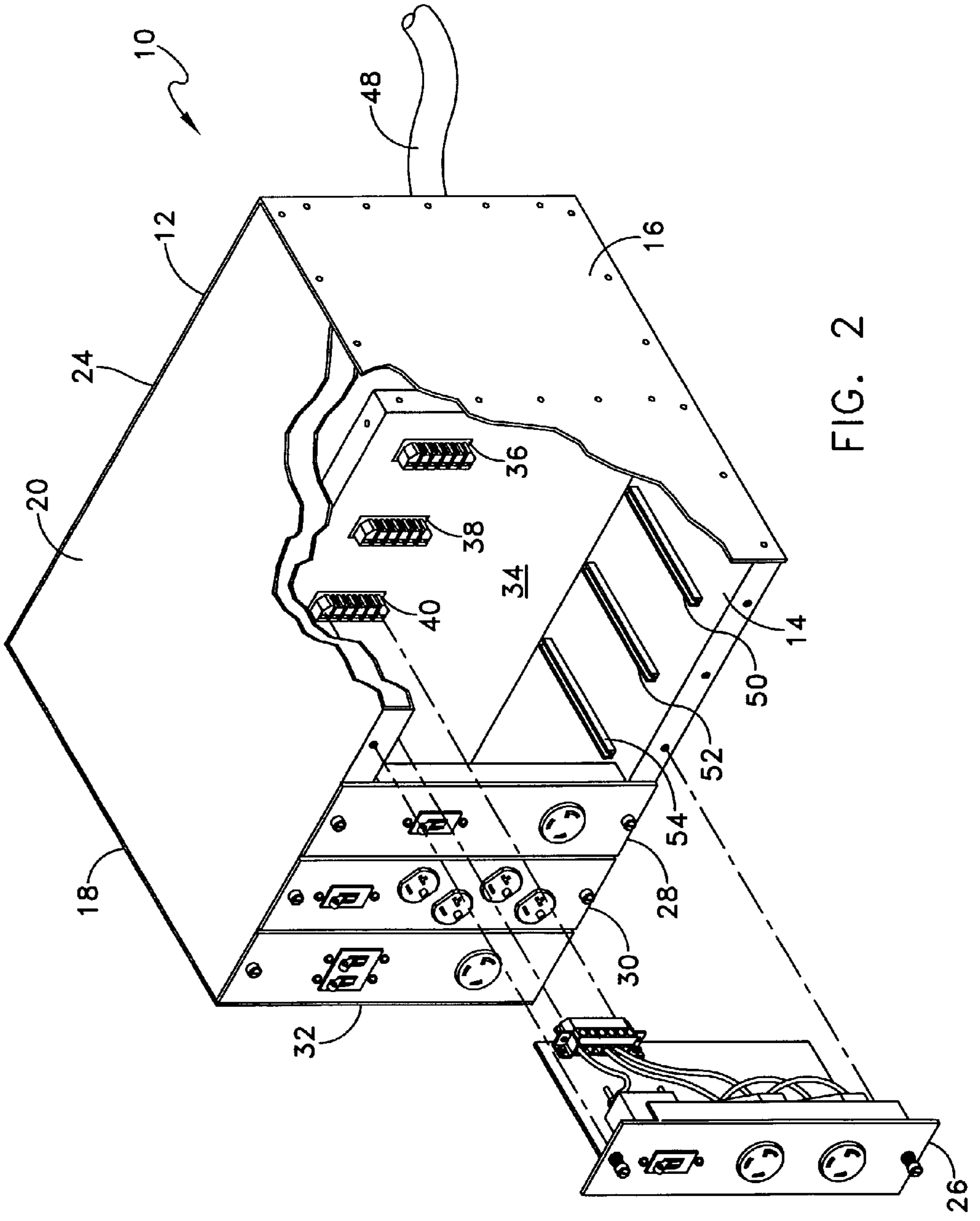
FIG. 2 is a perspective cutaway view of the power distribution unit of FIG. 1, showing the interior and components therein.

A preferred embodiment of the a power distribution unit 10 according to the present disclosure is illustrated initially with reference to FIGS. 1 and 2, taken together, which show a front perspective view of the present disclosure. The power distribution unit 10 incorporates a frame 12 in the form of a box-shaped housing. The frame 12 includes a first support member 14, side panels 16 and 18, top panel 20, front panel 22 and rear panel 24. The frame 12 and its components are preferably fabricated from sheet steel to provide rigidity and durability, although other materials, may be contemplated. In use, the frame 12 may be mounted in an equipment rack or be floor mounted, depending on the size of the frame 12 and the user's needs.

The power distribution unit 10 includes at least one power module 26 and is generally configured to accommodate several power modules 28, 30, 32, as shown in FIGS. 1 and 2. Although four power modules are shown, it can be seen that additional slots are provided for two more power modules in the preferred embodiment. The front-facing side of the frame 12 is basically open and provides means for accepting and mounting therein one or more power modules.

Figure 4:
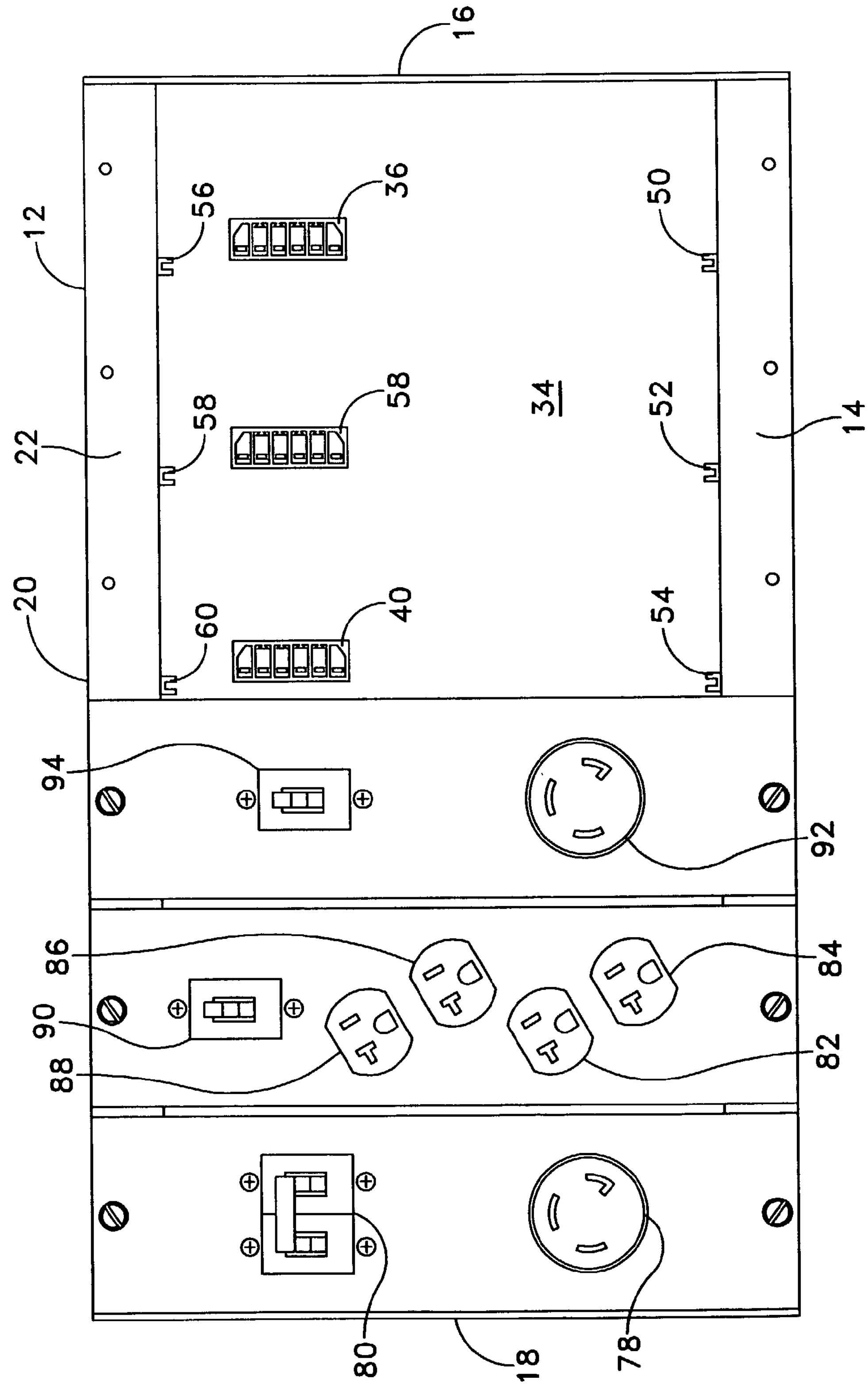
FIG. 4 is a front plan view of the power distribution unit shown in FIG. 1.
Figure 6:
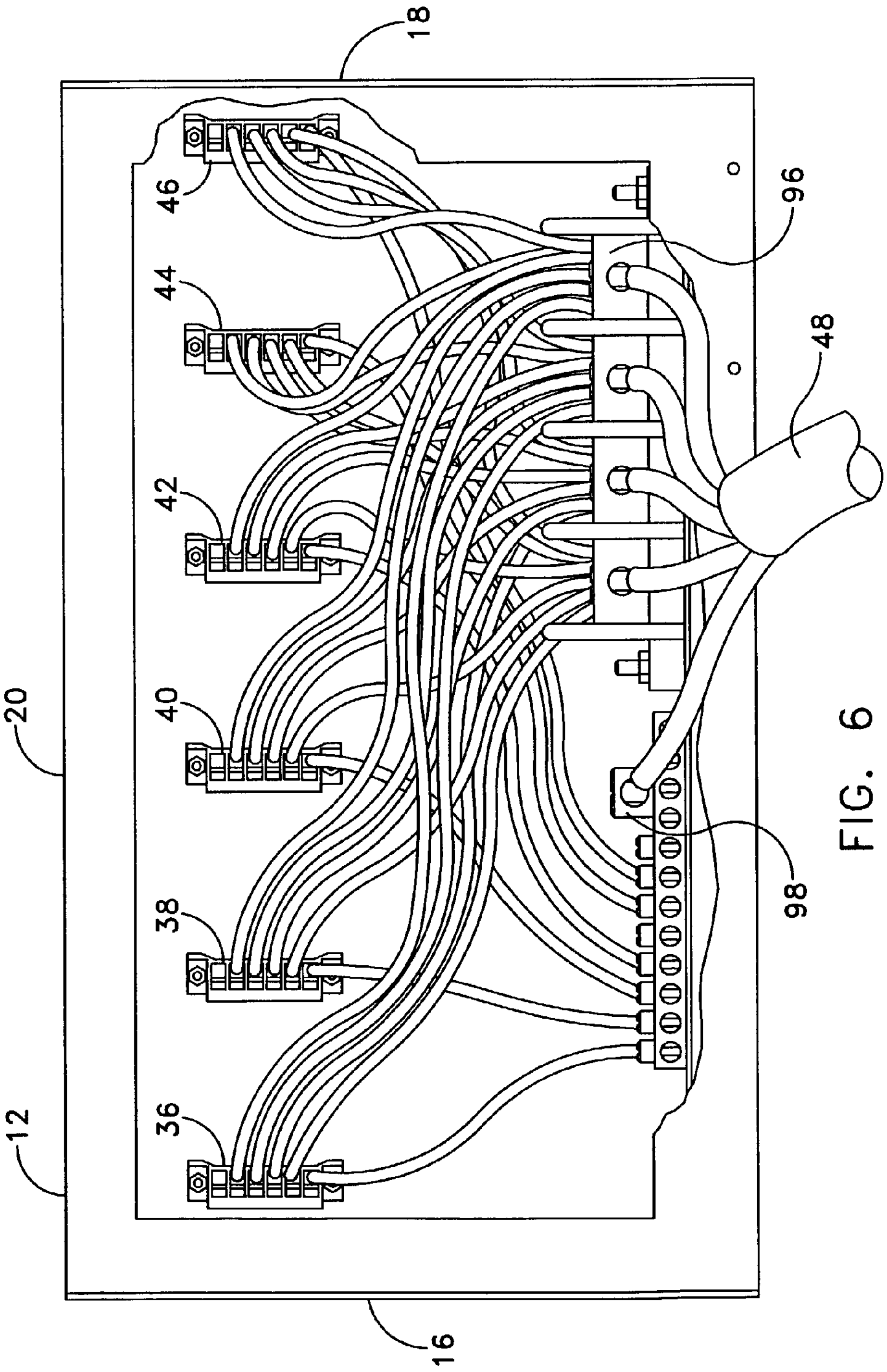
FIG. 6 is an rear plan partial-cutaway view of the power distribution unit shown in FIG. 1.

The first support member 14 is a welded structure having upper and lower surfaces to provide a rigid base for supporting all the components of the power distribution unit 10. The frame 12 includes a dividing wall 34 mounted on the first support member 14. The dividing wall includes first and second opposing surfaces. The dividing wall 34 divides the frame 12 into first and second sections in which various components of the power distribution unit 10 are positioned. The dividing wall 34 includes a plurality of apertures (not illustrated) in which a corresponding number of electrical connectors 36–46 may be supported, as shown in FIGS. 2, 4 and 6. When inserted into the apertures, a portion of each of the electrical connectors 36–46 extends through the dividing wall 34 into the first section and into the second section. The electrical connectors 36–46 are preferably rigidly attached to the dividing wall 34 by, for example, friction fitting, gluing, or with fasteners such as screws, rivets, and the like, as shown in the present embodiment.

A power cable 48 provides a source of electrical power to the power distribution unit 10 and to the connectors 36–46 from a coupled power supply (not shown). The power provided over power cable 48 by the power supply should be sufficient to drive a fully loaded power distribution unit 10, that is, where power distribution modules occupy each slot. The electrical connections and cabling will be explained in more detail further on. Those of ordinary skill in the art will recognize that any other means or method of connecting power to power distribution 10 may be used, and that the system is not limited to a direct connection.

Power modules will now be explained in connection with FIGS. 2 and 3. Power modules function basically to receive electrical power from the power distribution unit 10 through an attached connector and to route the power though a switched device such as a circuit breaker to receptacles mounted on the front bezel of the power module. Power modules 26–32 slide into the frame 12 in predefined slot positions, so that, in its fully inserted position, the connector on the power module 26 couples with one of the connectors 36–46 supported on the dividing wall 34. The frame 12 includes upper and lower card guides 50–60 for linearly guiding a power module 26 into any of the six slots that correspond to the connectors 36–46 mounting on the dividing wall 34. It is also contemplated that card guides 50–60 may include grounding channels to provide a ground connection to the power module 26 when it is inserted into the frame 12, as shown in the present embodiment. Alternatively, the grounding channels may be eliminated by including in each male connector a grounding pin (i.e. longer than other pins in the male connector), which also will provide a ground connection to the power module 26.

Figure 3:
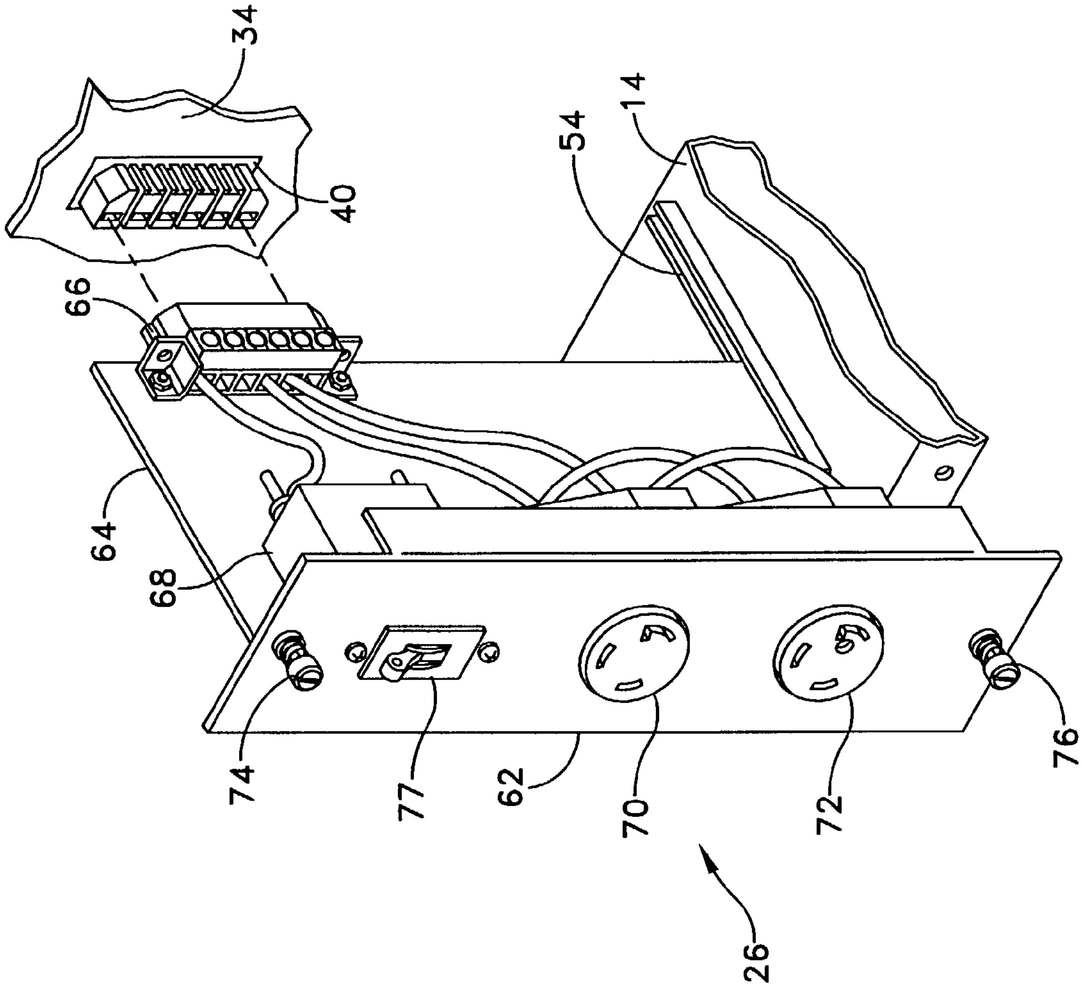
FIG. 3 is a perspective view of a power module shown in the unit of FIG. 1.

Turning to FIG. 3, a typical power module 26 is shown in more detail. The power module 26 includes a bezel 62, perpendicularly mounted on a card 64. The card 64 includes a power connector 66 for coupling with a complementary connector 40 mounted in the dividing wall 34. The bezel 62 includes cutouts for mounting a switched device, such as circuit breaker 68 and one or more power receptacles 70, 72. The card 64 is sized for engaging the corresponding set of upper and lower card guides 60, 54 for the slot into which it is being inserted. Although a circuit breaker is shown herein, it should be understood that any switch capable of controlling the designated current flow may alternatively be used.

When installed in the frame 12, the power module 26 is held in firm place within the frame 12 by holding screws 74, 76. The holding screws 72,74 have knurled heads, which respond to finger pressure for tightening or loosening. Knurled head screws are well known in the art for holding or clamping removable modular components in electrical cabinets and the like.

There are various types of power modules each having different power ratings and different receptacles. In environments such as computer rooms, three-phase power receptacles may be required. Power modules are provided with single, duplex, or multiple receptacle configurations. In the preferred embodiment, a wide variety of power module configurations are provided. A catalog of available power modules provides a user with a full range of power receptacle configurations, defined by standards established by various agencies or associations such as NEMA (National Electrical Manufacturers Association), which is conventional in the United States. Other standards that have been established domestically and/or internationally include, for example, CEE, CEE 7-7, BS, AS/NZS, CEI, SEV, SI, AFSNTI, EDP, JIS, IEC320, and IEC309. The various module configurations may be ordered as needed or an inventory of selected power modules may be stored for ready use, depending on the needs of the user and the particular installation. For example, NEMA receptacle configurations which are usable with the present disclosure include: 5-15R; 5-20R; 6-20R; L5-20R; L5-30R; L6-20R; L6-30R; L14-30R; and L21-30R. In the preferred embodiment, power modules with three-phase receptacles are provided in A, B & C phase configurations to facilitate load balancing requirements.

The module breaker 68 controls power to the receptacles on the power module 26. The breaker 68 includes a manually-operated switch 77 for powering the module on and off. The module breaker 68 is rated to accommodate the current being delivered to the receptacles 70,72 of each particular power module 26.

Turning now to FIG. 4, a front view of the power distribution unit 10 is shown, in which it can be readily be seen that power modules having different receptacle types, different receptacle numbers, and different power capabilities can be accommodated or interchanged in the power distribution unit 10. The left-most power module 32 includes a single NEMA L6-20R receptacle 78 and double-pole 20-amp circuit breaker 80. The middle power module 30 includes four NEMA 5-20R power receptacles 82–88 and a single pole 20-amp circuit breaker 90. The right-most power module 28 includes a single NEMA L5-20R receptacle 92 and a single pole 20-amp circuit breaker 94. The receptacles may include locking and non-locking types.

Figure 5:
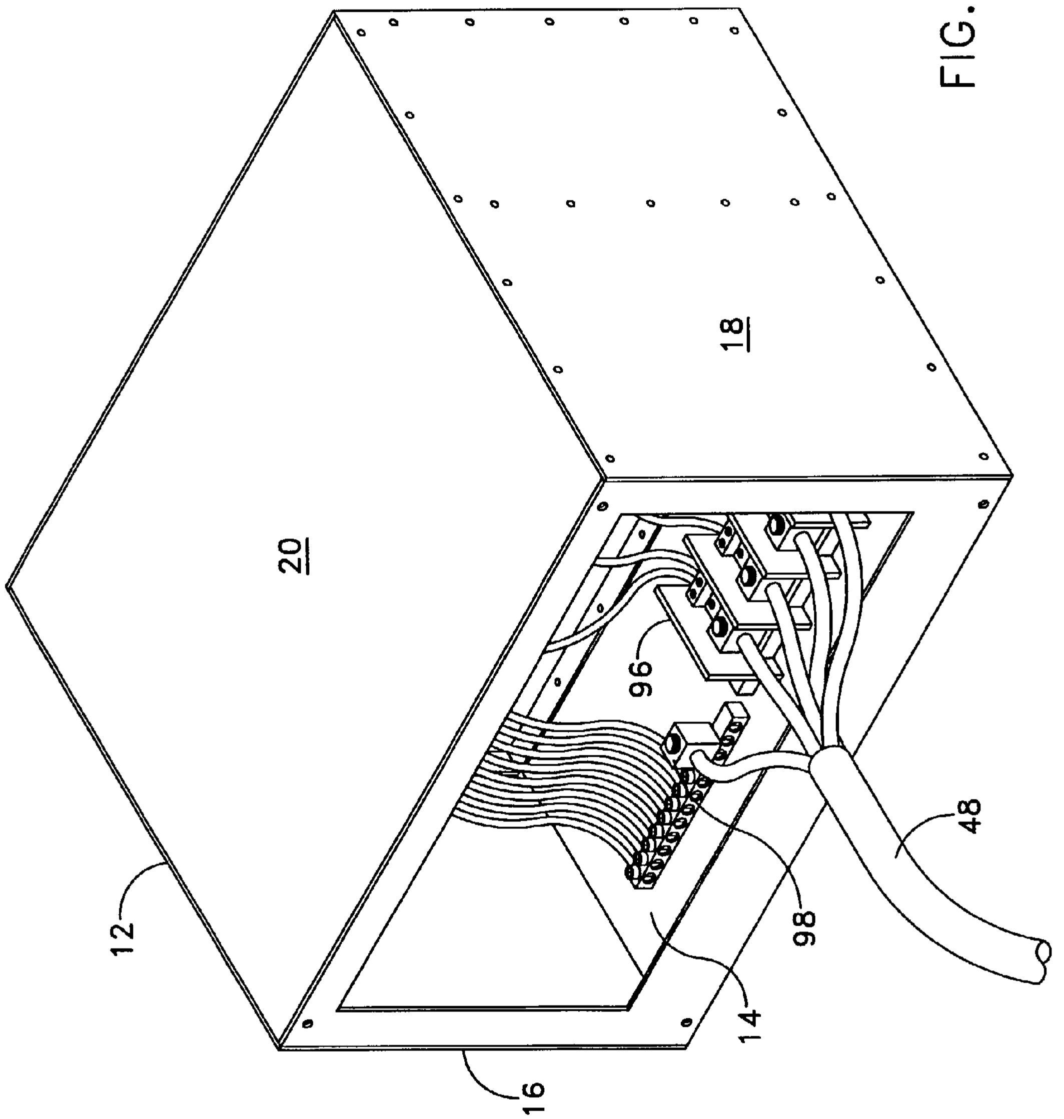
FIG. 5 is a rear perspective view of the power distribution unit shown in FIG. 1.

FIGS. 5 and 6 show the rear section of the power distribution unit 10, with the rear panel 24 removed so that the internal components are visible. The components and wiring contained within the rear section of the power distribution unit 10 are for receiving power from a power source and distributing the power to the electrical connectors 36–46 mounted in the dividing wall 34. The power source may be any mechanism capable of providing direct or alternating current from any generating source.

The rear section, behind the dividing wall 34, includes a terminal block 96 and a grounding block 98. In the preferred embodiment, a main breaker 100 is also provided to be electrically coupled between the power source and the terminal block, as shown in the schematic diagram of FIG. 7. The terminal block 96 and grounding block 98 are preferably supported on the first support member 14. The main breaker 100 is preferably mounting on and extends through the rear panel 24 (removed in the figures). The terminal block 96 is adapted to be coupled to a source of power by the power cable 48 and to the grounding block 98. The power cable 48 includes a number of individual conductors that are coupled, through interconnecting wiring, to the main breaker 100 and to the terminal block 96. Alternative means of connection also may be used, if desired or more practical, such as printed circuit board.

The terminal block 96 has a number of connection points. The purpose of the terminal block 96 is to distribute power to the connectors 36–46 mounted in the dividing wall 34 of the frame 12. Each of the electrical connectors 36–46 mounted in the dividing wall 34 have the same connections to the terminal block and to the ground connection; i.e. the electrical connectors 36–46 are commonly coupled to the grounding block 98 connection and commonly coupled to the terminal block 96. This wiring arrangement can also be seen in FIG. 7.

In the preferred embodiment, the main breaker 100 mounted on the rear panel 24 is rated at 90 amps, although other variations may be used, such as a 50 amp main breaker. It is also contemplated that the frame 14 may be customized for the particular application, and have a main breaker rating which will be specified by the user. For example, any rating within the range of between 0.10 and 100 amps may be specified. Alternatively, the frame may include a NEMA rated female inlet or a male inlet such as, for example, a NEMA L2130 male inlet, or a direct wiring connection.

Figure 7:
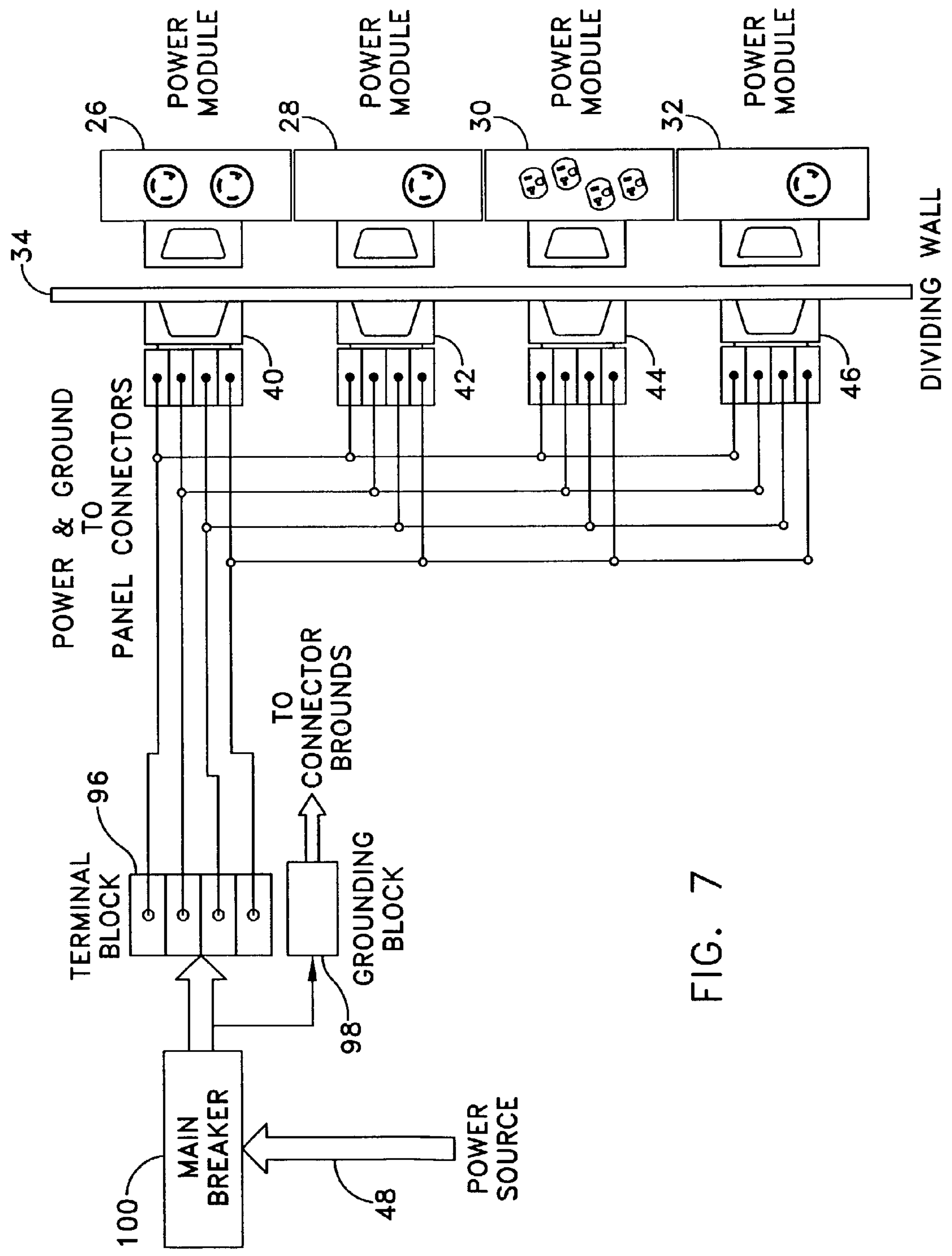
FIG. 7 is a simplified schematic of the preferred embodiment of the present disclosure.

FIG. 7 schematically illustrates the electrical connections of the power distribution unit 10, showing the interconnection wiring for the four power modules 26–32 shown in FIGS. 1 and 2. Electrical power from a power source, received though the power cable 48, is routed through the main breaker 100, which provides overall control of the electric power. The power is then routed to the terminal block 96 and the grounding block 98. From the terminal block 96, the wiring fans out to the connectors 40–46 mounted in the dividing wall 34. Power modules 26–32, installed in the frame 12 of the power distribution unit are automatically coupled to the connectors 40–46 by means of their own connectors, and power is routed to the electrical receptacles of the power modules 26–32.

To use the power distribution unit 10, a user would first determine the power requirements for some equipment in the particular environment such as a computer room. The user would then choose an appropriate power module 26 to install in an empty slot of the frame 12. Alternatively, if no slots are empty in the frame 12, an unused power module 26 may be removed and the new power module 26 inserted. The new power module 26 would have receptacles 70, 72 to fulfill the specific power requirement for equipment needing power. Often, the altered power requirements may be met by a single power module 26. The module 26 is purchased or taken from stock, for the particular application needed, and simply installed in the frame 14 by turning off the module breaker switch 77, inserting the power module 26 into the frame 12, tightening the two retaining screws 74,76 and then switching the breaker switch 77 on. The installation is completed and the new equipment may then be attached to the receptacles 70, 72 and provided with electrical power.

It should be appreciated that installation of a power module 26 is accomplished in "hot-swap" mode, without turning off the power to the power distribution unit 10 or without turning off power to any other power module 26. In a similar manner, an old or unused power module 26 may be removed without interrupting power to the power distribution unit 10 simply by switching off its associated breaker switch 77 and removing the power module 26 from its slot.

Figure 8:
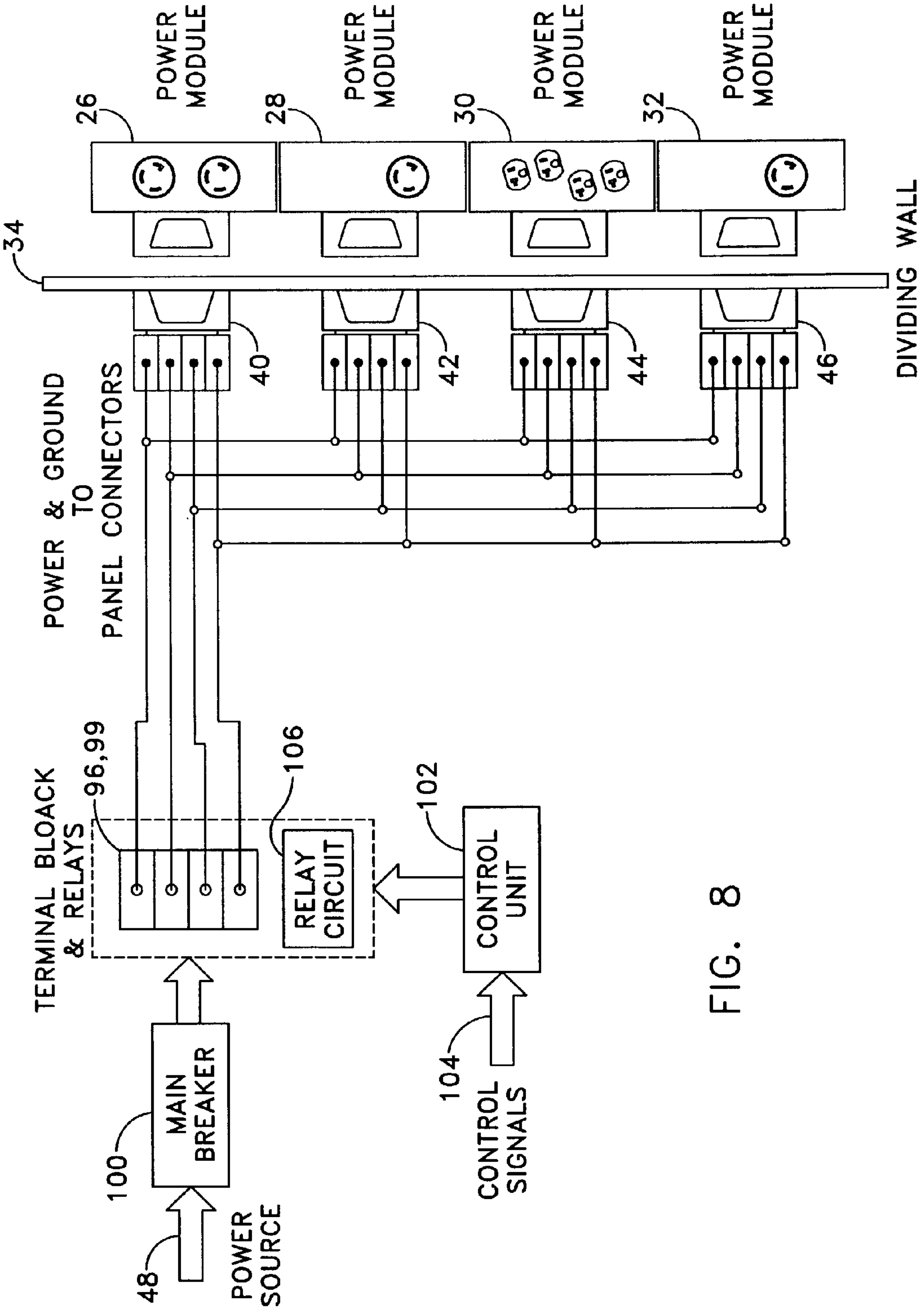
FIG. 8 is a simplified schematic of an alterative embodiment of the present disclosure, which employs a control unit for implementing a remote-control function in the power distribution unit.

Turning now to FIG. 8, an alternative embodiment is shown that provides a remote-control function to the power distribution unit 10. Some equipment, such as a computer CPU, memory units, and peripheral services require that these devices be powered on in a particular sequence to ensure proper operation. In other circumstances, it may be necessary to turn on one computer before another, or to otherwise sequence the startup of computer devices or other equipment attached to the power distribution unit 10. Alternatively, it may be desirable to turn on or turn off the various equipment at a particular clock time, for example.

The remote-control function is provided by a control unit 102, such as a single-board computer, which receives control signals 104 from an administrator (not shown). The signals may be received in a variety of manners, and may have a corresponding variety of attributes. For example, the single board computer may be a radio receiver, capable of receiving radio signals form a remote device controlled by the administrator some distance away from the control unit 102. Alternatively, the control signals may be analog or digital signals driven by an electrical device accessible to the administrator, and located on the enclosure, for example a keypad or the like. In addition, the control signals could be forwarded from a preprogrammed device that turns on the power supplies in a given predefined pattern. In any of these implementations, upon receipt of the control signals 104 or upon activation of the software-controlled trigger, the relay circuit 106 apparatus will selectively operate to turn on or turn off the selected power module as desired.

In still another embodiment, the control unit 102 may take the form of a single board computer installed in the frame 12 with an appropriate electrical connector. The control unit 102 would trigger a relay circuit 106 to control power to the individual power modules 26–32. Or the power modules 26–32 themselves may include relay circuits 106 responsive signals received from the control unit 102. In this embodiment, users could remotely communicate with the power distribution unit 10 via telephone, cable, or DSL lines. Once connected the user can remotely and individually control power to each module receptacle.

Figure 9:
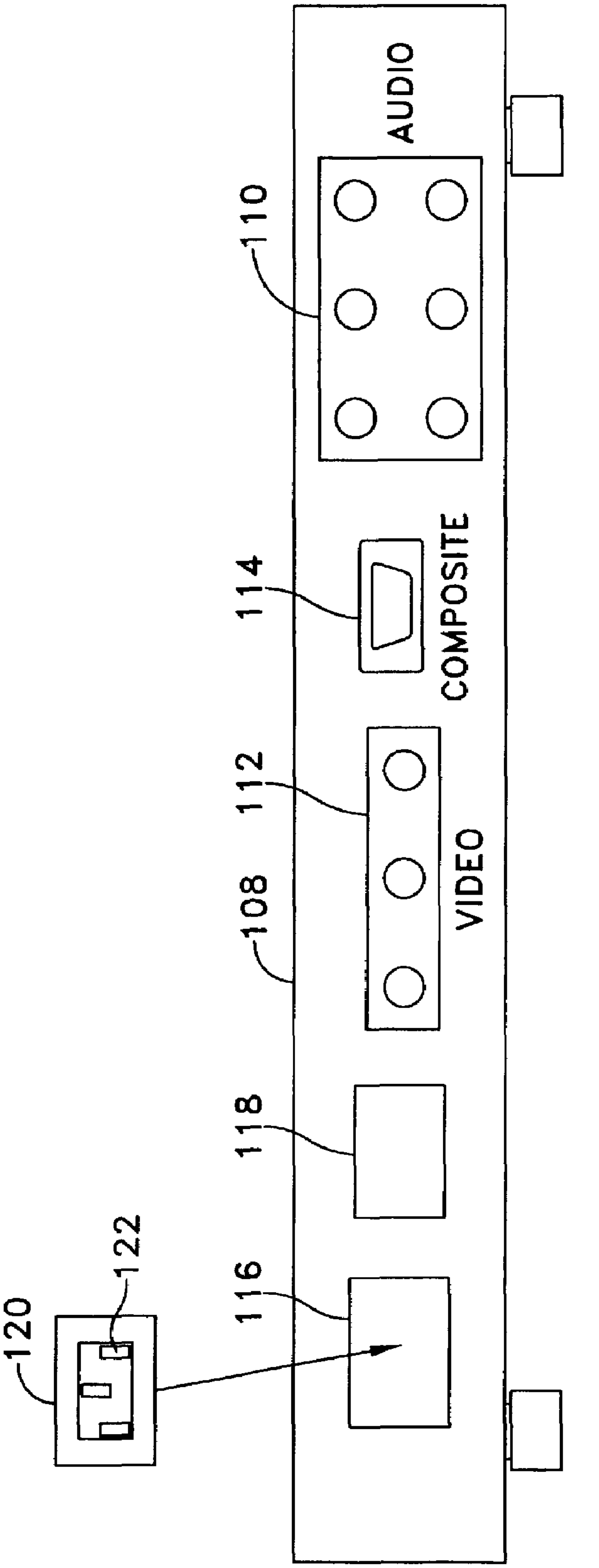
FIG. 9 illustrated still another embodiment of the present invention, in which a power module is installed in an electronic entertainment product.

Still another alternative embodiment of the enclosure is illustrated in FIG. 9. The concepts of the present disclosure may be incorporated into electronic entertainment products such as VCRs and DVD, so that these devices may be more easily adapted for use in different countries. From country to country, the electric power systems vary in voltage, frequency, and plug type. The United States has a standard of 120 VAC, 60 Hz, with A & B plug types. European countries are converting to a standard of 230 VAC, 50 Hz, but there are still variations in plug types. Other countries differ even more widely from these standards. By using the concepts of the present disclosure, electronic entertainment products or other electric products may either be adapted by the manufacturer for the country of use, or be adapted by a user traveling to another country.

In FIG. 9, the back panel of a DVD player 108 is shown. The DVD player 108 includes a number of audio plug sockets 110, video plug sockets 112, and a connector 114 for the output of composite video. The DVD player 108 also includes two power module slots 116, 118, for illustrative purposes, although a single slot 116 may be used to implement the concepts of the present disclosure. A power module 120 fits into the slot, so that a connector associated with the power module 120 couples to a connector in the slot. The power module 120 is adapted for receiving power from the electric power of the country of use and for converting that power as necessary for operating the DVD player 108. The power module 120 includes a receptacle 122 for receiving a power cord for attaching the DVD player 108 to a source of electric power. A second slot 118 will accept a second module so that a single DVD player 108 may be configured for use in more than one country. Using the principles of the present disclosure, a manufacturer may provide a universal DVD player or other electric device that could be adapted for use in any country after the insertion of the proper power module 120 in an open slot 116.

The description of the disclosure has been directed to certain exemplary embodiments. Various modifications of these embodiments, as well as alternative embodiments, will become readily apparent to those skilled in the art. For example, the power distribution unit of the present disclosure is scalable. Although the configurations presented in the preferred embodiments generally are shown to have six slots to accommodate six power modules, it is within the scope of the present disclosure to include a frames of any needed size for accommodating any needed number of power modules, depending of the application. Further, the available power module types may include greater numbers and varieties of power receptacles than illustrated. These and other modifications are certainly within the scope of the present disclosure. Accordingly, the description is to be considered in all respects only as illustrative and not restrictive. The scope of the disclosure is indicated by the appended claims rather that by the forgoing description, and all changes that come within the meaning and range of equivalency of the claims are to be embraced within their scope.

What is claimed is:

1. A power distribution system, comprising:

a power module including a module connector for receiving electrical power to the module and a receptacle for providing electrical power to a user device;

a frame for receiving and securing the power module;

a connector panel within the frame including a panel connector for coupling with the module connector to provide electrical power thereto when the power module is inserted in the frame; and a power conductor for receiving electrical power from a power source and coupling the electrical power to the panel connector.

2. A power distribution system as recited in claim 1, the power module further including a switch for controlling the electrical power.

3. A power distribution system as recited in claim 1, wherein the power module includes a plurality of electrical receptacles.

4. A power distribution system as recited in claim 1, further including a guide channel within the frame for guiding the power module into the frame.

5. A power distribution system, comprising:

a plurality of interchangeable power modules, each power module including a module connector for receiving electrical power to the corresponding module and a receptacle for providing electrical power to a user device;

a frame for receiving and securing a plurality of said power modules;

a connector panel within the frame including a plurality of panel connectors for coupling with the corresponding module connectors to transfer electrical power thereto when the power modules are inserted therein; and a power conductor for receiving electrical power from a power source and coupling the electrical power to the panel connectors.

6. A power distribution system as recited in claim 5, each power module further including a switch for controlling the electrical power.

7. A power distribution system as recited in claim 5, wherein each power module includes a plurality of electrical receptacles.

8. A power distribution system as recited in claim 5, further including a guide channels within the frame for guiding the power modules into the frame.

9. A power distribution system as recited in claim 5, wherein a first module of the plurality of power modules includes a receptacle of a first type and a second module of the plurality of power modules includes a receptacle of a second type.

10. A power distribution system as recited in claim 5, wherein a power module may be removed and replaced without interrupting power to adjacent power modules.

11. A power distribution unit, comprising:

a frame for receiving a plurality of interchangeable power modules, each module including a module connector for receiving electrical power and a receptacle for providing electrical power to a user device;

the frame including a support member and a dividing panel for dividing the interior space of the frame into first and second regions;

the dividing panel including a plurality of panel connectors mounted therein for coupling with corresponding module connectors of the received power modules;

a plurality of guide channels mounted on the support member for guiding the power modules into the first region of the frame; and a terminal block mounted in the second region of the frame for receiving electrical power from an electric power source and distributing the electrical power to the plurality of panel connectors.

12. A power distribution unit as recited in claim 11, further including a main breaker for controlling power from the power source to the terminal block.

13. A power distribution unit, comprising:

a first support member;

a dividing wall having first and second opposing surfaces, the dividing wall dividing the first support member into first and second regions;

a terminal block, a main breaker, and an electrical harness positioned in the first region, the terminal block being constructed and arranged to be coupled to a source of power and to a ground connection, the electrical harness being connected to the main breaker and the terminal block; and a plurality of electrical connectors, a first portion of each of the plurality of the electrical connectors extending through the dividing wall into the first region and a second portion of each of the plurality of the electrical connectors extending through the dividing wall into the second region, the first portion of each of the electrical connectors being commonly coupled to the ground connection and commonly coupled to the terminal block.

14. The power distribution unit of claim 13, wherein the electrical connectors include a female connector portion, and the female portion extends through the dividing panel to the second region.

15. The power distribution unit of claim 13, wherein the electrical connectors have a male connector portion, and the male connector portion extends through the dividing panel to the second region.

16. The power distribution unit of claim 13, further comprising opposing sidewalls positioned perpendicular to and adjacent to the dividing wall, and a second support member positioned parallel to the first support member.

17. The power distribution unit of claim 13, further comprising a plurality of guide channels positioned in the second region, the guide channels being positioned perpendicular to the dividing wall.

18. The power distribution unit of claim 17, wherein the guide channels further comprise grounding channels.

19. The power distribution unit of claim 17, wherein the plurality of guide channels are positioned on a first support member.

20. The power distribution unit of claim 19, wherein the guide channels further comprise grounding channels.

21. The power distribution unit of claim 13, wherein the terminal block is coupled to a power source.

22. The power distribution unit of claim 21, wherein the power source is three-phase.

23. The power distribution unit of claim 13, wherein each electrical connector has at least one grounding connection and at least one live connection.

24. The power distribution unit of claim 13, wherein each electrical connector comprises at least one live connection.

25. The power distribution unit of claim 13, wherein the terminal block comprises at least two terminal connections.

26. A power module for use in a power distribution unit including a frame for receiving the power module and securing it therein, and a connector panel within the frame including a panel connector for transferring electrical power to the power module when the power module is inserted therein, and power coupling means for receiving electrical power from a power source and coupling the electrical power to the panel connector, the power module comprising:

a power module housing adapted for being inserted into the frame;

a module connector for mating with the panel connector when the power module is inserted into the frame;

a module receptacle for providing electrical power to a user device; and a switch for controlling electrical power to the module receptacle.

27. The module of claim 26, wherein the module connector is a male connector.

28. The module of claim 26, wherein the module connector is a female connector.

29. In a power distribution system including a plurality of interchangeable power modules, each power module including a module connector for receiving electrical power to the module and a receptacle for providing electrical power to a user device; a frame for receiving and securing a plurality of said power modules; a connector panel within the frame including a plurality of panel connectors for coupling with the corresponding module connectors to transfer electrical power thereto when the power modules are inserted therein; and a power conductor for receiving electrical power from a power source and coupling the electrical power to the panel connectors, a method of interchanging power modules comprising the steps:

selecting an first module for replacement;

deactivating electrical power on the first module;

removing the first module from the frame;

selecting a second individual power module to replace the first;

inserting the second power module in the frame in place of the first one of the power modules; and activating electric power on the second module.

30. A method of interchanging power modules as recited in claim 29, wherein the first one of said power modules includes a receptacle of a first type and the replacement power module includes a receptacle of a second type.

31. A method of interchanging power modules as recited in claim 29, wherein the step of removing a first the first power module and the step of inserting the second power module is performed without interrupting power to adjacent power modules.

32. A remote-controlled power distribution unit, comprising:

a frame for receiving a plurality of interchangeable power modules, each module including a module connector for receiving electrical power and a receptacle for providing electrical power to a user device;

the frame including a support member and a dividing panel for dividing the interior space of the frame into first and second regions;

the dividing panel including a plurality of panel connectors mounted therein for coupling with corresponding module connectors of the received power modules;

a plurality of guide channels mounted on the support member for guiding the power modules into the first region of the frame;

a terminal block mounted in the second region of the frame for receiving electrical power from an electric power source and distributing the electrical power to the plurality of panel connectors; and a control unit coupled to the terminal block and responsive to control input signals for selectively controlling the distribution of power to individual power modules.

33. A remote-controlled power distribution unit as recited in claim 32, wherein the control input signals are received through a telephone line.

34. A remote-controlled power distribution unit as recited in claim 32, wherein the control input signals are received through a DSL line.

35. A remote-controlled power distribution unit as recited in claim 32, wherein the control input signals operating with the control circuit control the individual power modules in a predetermined sequence to provide or remove power from the power module receptacles in a predetermined order.

36. A remote-controlled power distribution unit as recited in claim 32, wherein the control input signals, operating with the control circuits control the power modules in a predetermined time to provide or remove power from the individual power module receptacles at a predetermined time.

37. A remote-controlled power distribution unit as recited in claim 32, wherein the control input signals are provided by a software-program.

38. A remote-controlled power distribution unit as recited in claim 32, wherein certain ones of the plurality of power modules are manually controlled and certain others of the plurality of power modules are controlled by control input signals operating with the control circuit.

39. In combination, at least one power distribution module, the module comprising:

a support member;

an electrical connector supported on the support member; and a first selected plug receptacle supported on the support member and being coupled to the electrical connector, the first selected plug receptacle being constructed and arranged to receive power from a power distribution unit and to distribute power therethrough when the electrical connector is coupled to a power distribution unit; and a power distribution unit for receiving the modules, the power distribution unit comprising:

a first support member;

a dividing wall having first and second opposing surfaces, the dividing wall dividing the first support member into first and second regions;

a terminal block, a main breaker, and an electrical harness positioned in the first region, the terminal block being constructed and arranged to be coupled to a source of power and to a ground connection, the electrical harness being connected to the main breaker and the terminal block; and a plurality of electrical connectors, a first portion of each of the plurality of the electrical connectors extending through the dividing wall into the first region and a second portion of each of the plurality of the electrical connectors extending through the dividing wall into the second region, the first portion of each of the electrical connectors being commonly coupled to the ground connection and commonly coupled to the terminal block; and the second portion of the electrical connectors being constructed and arranged to receive at least one of the power distribution modules and to couple with the electrical connectors of at least one of the plurality of power distribution modules.

40. A power distribution unit, comprising:

a housing divided into two chambers defined by an interior wall, the first chamber being a module compartment and the second chamber being a wiring compartment;

the interior wall including a plurality of apertures, a plurality of module connectors being supported in the apertures and being common to the module compartment and the wiring compartment;

a module including a breaker, a first selected plug receptacle, and a first connector coupled to the breaker and to the first selected plug receptacle, the first connector being connected to at least one of the plurality of module connectors;

the module compartment including a plurality of oppositely disposed channels supported on oppositely disposed walls, one of each of the corresponding channels including a grounding strip; and the wiring compartment including a terminal block supported on a portion of the wiring compartment, the wiring compartment including a main breaker, a grounding connection, and an electrical harness, the electrical harness being connected to the main breaker and the terminal block, the terminal block being constructed and arranged to be coupled to a source of power, each of the plurality of module connectors being coupled to the terminal block.

41. An electrical product for operating in local environments having different electrical power sources:

a housing;

an electrical circuit within the housing;

at least one power module slot in the housing for receiving and coupling a power module to the electrical circuit; and at least one power module adapted for coupling with an electric power source from a local environment and for converting the electric power for use by the electrical circuit wherein the power module includes a receptacle adapted for coupling with the electric power source from the local environment wherein the product is a VCR.

42. An electrical product for operating in local environments having different electrical power sources:

a housing;

an electrical circuit within the housing;

at least one power module slot in the housing for receiving and coupling a power module to the electrical circuit; and at least one power module adapted for coupling with an electric power source from a local environment and for converting the electric power for use by the electrical circuit wherein the power module includes a receptacle adapted for coupling with the electric power source from the local environment wherein the product is a DVD player.

43. An electrical product for operating in local environments having different electrical power sources:

a housing;

an electrical circuit within the housing;

at least one power module slot in the housing for receiving and coupling a power module to the electrical circuit; and at least one power module adapted for coupling with an electric power source from a local environment and for converting the electric power for use by the electrical circuit, further comprising a second power module slot in the housing for receiving a second power module.

44. An electric product as recited in claim 43, wherein the second power module is adapted for coupling with an electric power source from a second local environment and for converting the electric power for use by the electric circuit.

45. An electric product as recited in claim 43, wherein the electric power source from the second local environment is different than the power source from the first local environment.

46. In an electric product including a housing; an electric circuit in the housing; at least one power module slot in the housing for receiving and coupling a power module to the electrical circuit; and a first power module adapted for coupling with an electric power source from a first local environment and for converting the electric power for use by the electrical circuit, a method of adapting the electric product for use in a second local environment, comprising the steps:

removing the first power module;

selecting a second power module adapted for coupling with the electric power source from the second local environment and for converting the electric power for use by the electrical circuit; and replacing the first power module with the second power module.

* * * * *